(12) United States Patent
Park

(10) Patent No.: US 8,376,556 B2
(45) Date of Patent: Feb. 19, 2013

(54) FOCUS UNIT FASTENING DEVICE FOR PROJECTOR

(75) Inventor: Joong-Wan Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 266 days.

(21) Appl. No.: 12/836,310

(22) Filed: Jul. 14, 2010

(65) Prior Publication Data

US 2011/0013153 A1    Jan. 20, 2011

(30) Foreign Application Priority Data

Jul. 16, 2009 (KR) .................. 10-2009-0064771

(51) Int. Cl.
*G03B 3/00* (2006.01)
*G03B 21/14* (2006.01)

(52) U.S. Cl. .................................. 353/119; 353/101
(58) Field of Classification Search ............. 353/100, 353/101, 119; 359/815

See application file for complete search history.

(56) References Cited

U.S. PATENT DOCUMENTS

| | | | |
|---|---|---|---|
| 2004/0247306 A1* | 12/2004 | Jeong et al. | 396/85 |
| 2006/0203211 A1* | 9/2006 | Kim | 353/101 |
| 2007/0064205 A1 | 3/2007 | Meng et al. | |
| 2007/0258059 A1 | 11/2007 | Park et al. | |

FOREIGN PATENT DOCUMENTS

| | | |
|---|---|---|
| EP | 1 484 626 | 12/2004 |
| EP | 1 701 207 | 9/2006 |
| JP | 2007-213832 | 8/2007 |
| JP | 2008-064131 | * 3/2008 |
| KR | 1020067000776 | 11/2006 |
| KR | 100735422 | 6/2007 |
| KR | 1020077001346 | 12/2007 |
| KR | 100810260 | 2/2008 |

* cited by examiner

*Primary Examiner* — William C Dowling
(74) *Attorney, Agent, or Firm* — The Farrell Law Firm, P.C.

(57) ABSTRACT

Provided is a focus unit fastening device for a projector, in which a plurality of fastening portions for coupling a focus unit to the projector by pushing and inserting the focus unit into the projector are formed integrally with a main body housing and the focus unit. The focus unit fastening device includes a projector main body housing, a focus unit engaged to the main body housing, a first fastening portion provided on the main body housing and the focus unit to fasten the focus unit to the main body housing by pushing the focus unit in a first direction and to prevent the focus unit from moving in a second direction perpendicular to the first direction, and a second fastening portion provided on the main body housing and the focus unit to fasten the focus unit to the main body housing by pushing the focus unit in the first direction and to prevent the focus unit from moving in the first direction.

10 Claims, 8 Drawing Sheets

FOCUS UNIT FASTENING DEVICE FOR PROJECTOR

PRIORITY

This application claims priority under 35 U.S.C. §119(a) to an application filed with the Korean Intellectual Property Office on Jul. 16, 2009 and assigned Serial No. 10-2009-0064771, the contents of which are incorporated herein by reference.

BACKGROUND OF THE INVENTION

1. Field of the Invention

The present invention relates generally to a focus unit fastening device for a projector, and particularly, to such a focus unit fastening device in which a plurality of fastening portions for coupling a focus unit to the projector in such a manner as to push and insert the focus unit into the projector, are formed integrally with a main body housing and the focus unit.

2. Description of the Related Art

Generally, a "projector" refers to a device that forms an image on a display device, passes light generated from a light source through the display device, and projects the passed light onto an external screen, thereby showing the image on the screen.

Recently, the projector has been miniaturized for mounting and use on a portable terminal.

A portable terminal equipped with a projector is disclosed in Korean Patent Registration No. 10-810260 granted on Feb. 27, 2008 and titled "Portable Terminal with Projector", and Korean Patent Registration No. 10-735422 granted on Jun. 27, 2007 and titled "Image Offset Controlling Apparatus for Liquid Crystal Display Projector and Mobile Phone Therewith", both of which are assigned to the present assignee and are incorporated herein by reference.

As shown in FIG. 1, a miniaturized projector 1 includes a main body 2, an image projecting window 3 provided on a side of the main body 2, a lens assembly 4 installed in a position corresponding to the window 3, and a focus unit 7 provided on another side of the main body 2 to adjust the focus of a screen by the lens assembly 4.

The focus unit 7 is engaged to the main body 2 of the projector 1 by using a plurality of screws 5.

As shown in FIG. 1, the plurality of screws 5 is required to engage the focus unit 7 to the main body 2 of the projector 1. An engaging area 8 for the plurality of screws 5 must be provided on the main body 2 of the projector 1, thereby increasing the width of the focus unit 7, the screw-engaging space of the projector 1, the overall size and thickness of the projector, and the number of parts and thus the manufacturing cost of the product. Moreover, the value of the product is decreased due to an increase in the number of assembly processes required to make the product.

The engaging area 8 formed by injection on the main body 2 of the projector 1 and an injection-molded portion of the projector 1 may be easily damaged by impact generated due to droppage of the projector 1.

Accordingly, there is a need for a device for engaging a focus unit to a projector by pushing and inserting the focus unit into the projector, instead of by using a plurality of screws.

SUMMARY OF THE INVENTION

An aspect of the present invention is to address at least the above problems and/or disadvantages and to provide at least the advantages described below. Accordingly, an aspect of the present invention is to provide a focus unit fastening device for a projector, in which a plurality of fastening portions for coupling a focus unit to the projector in such a manner to push and insert the focus unit into the projector, instead of by using a plurality of screws, are formed integrally with a main body housing and the focus unit, thereby reducing the thickness and size of a projector due to the elimination of a screw-engaging space, and encouraging cost cutting and productivity improvement through a reduction in the number of parts.

According to an aspect of the present invention, there is provided a focus unit fastening device for a projector, including a projector main body housing, a focus unit engaged to the main body housing, a first fastening portion provided on the main body housing and the focus unit to fasten the focus unit to the main body housing by pushing the focus unit in a first direction and to prevent the focus unit from moving in a second direction perpendicular to the first direction, and a second fastening portion provided on the main body housing and the focus unit to fasten the focus unit to the main body housing by pushing the focus unit in the first direction and to prevent the focus unit from moving in the first direction.

BRIEF DESCRIPTION OF THE DRAWINGS

The above and other features and advantages of embodiments of the present invention will be more apparent from the following detailed description taken in conjunction with the accompanying drawings, in which.

DETAILED DESCRIPTION OF EMBODIMENTS OF THE INVENTION

Figure 1:
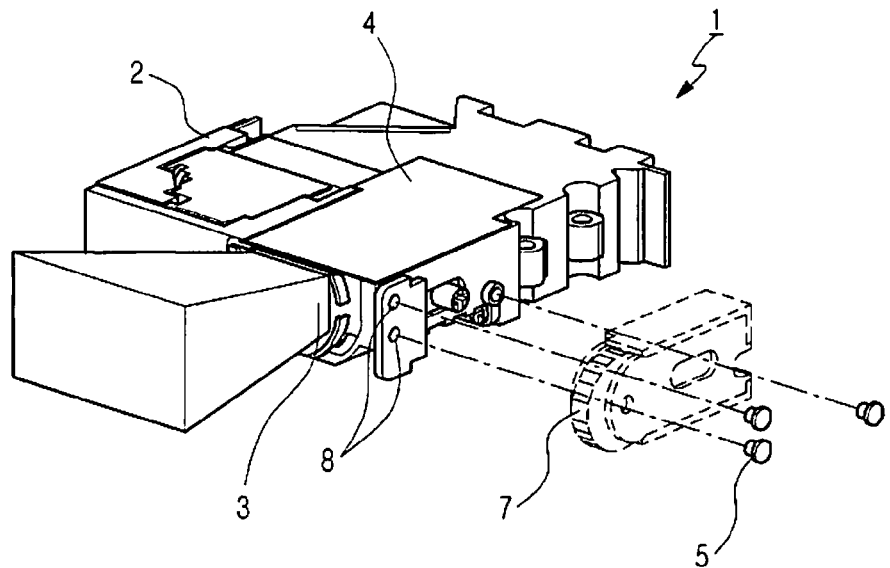
FIG. 1 illustrates a focus unit fastening device for a projector according to the prior art.
Figure 2:
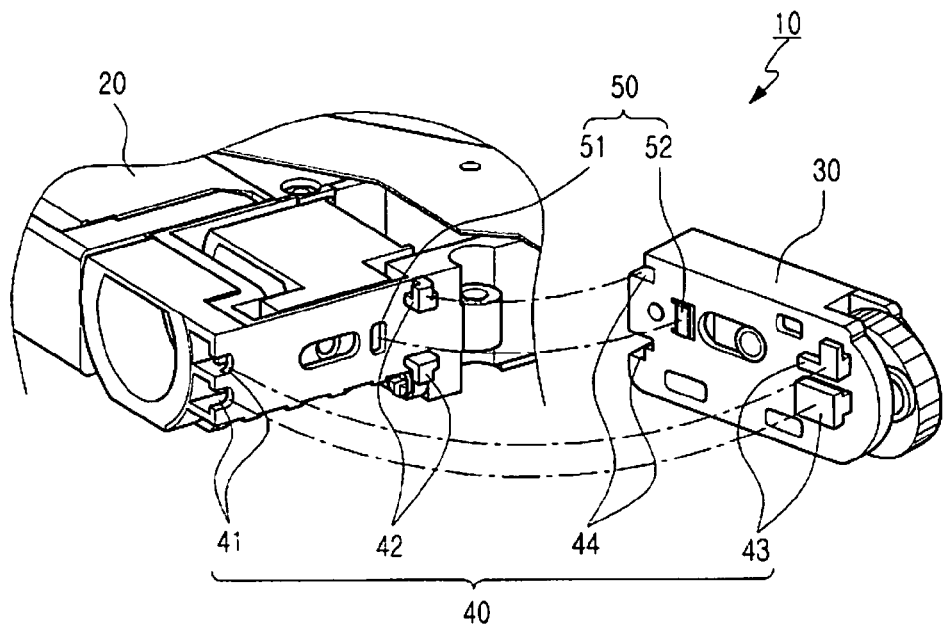
FIG. 2 illustrates a focus unit fastening device for a projector according to an embodiment of the present invention.
Figure 3:
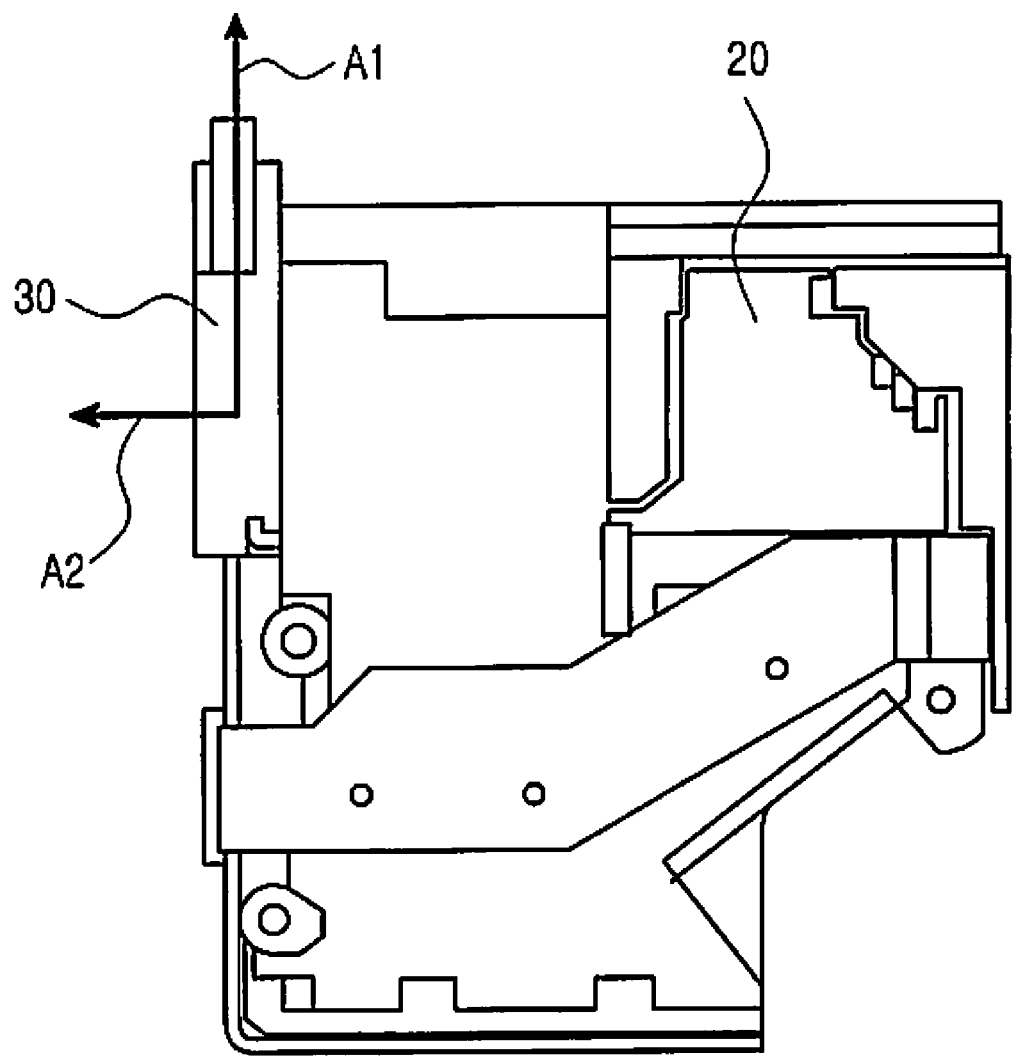
FIG. 3 illustrates a state of a focus unit fastening device for a projector in which a focus unit and a main body housing are coupled according to an embodiment of the present invention.

Hereinafter, embodiments of the present invention will be described in detail with reference to the accompanying drawings. The embodiments described herein and structures shown in the drawings are merely illustrative and do not cover every technical spirit of the invention. Therefore, it will be understood that various modifications that can substitute for the embodiments can be made at the time of filing the present application. Also, descriptions of well-known functions and constructions are omitted for the sake of clarity and conciseness.

As shown in FIGS. 2 through 6, a focus unit fastening device 10 for a projector includes a projector main body housing 20, a focus unit 30, and first and second fastening portions 40 and 50. The main body housing 20 is configured to allow the focus unit 30 to be engaged thereto, and the focus unit 30 is adapted to be fastened to a side of the main body housing 20 by the first and second fastening portions 40 and 50. The first fastening portion 40 is provided integrally with the main body housing 20 and the focus unit 30 to fasten the focus unit 30 to the main body housing 20 by pushing the focus unit 30 in a first direction A1, and to prevent the focus unit 30 from moving in a second direction A2 perpendicular to the first direction A1. The second fastening portion 50 is provided integrally with the main body housing 20 and the focus unit 30 to fasten the focus unit 30 to the main body housing 20 by pushing the focus unit 30 in the first direction A1, and to prevent the focus unit 30 from moving in the first direction A1.

As shown in FIGS. 2 and 4-6, the first fastening portion 40 includes one or more first and second suspension grooves 41 and 44 and one or more first and second hook portions 42 and 43. The first suspension grooves 41 are formed in a first side 20A of the main body housing 20 to be coupled and fixed to the second hook portions 43. The first hook portions 42 are formed on a second side 20B of the main body housing 20 to be coupled and fixed to the second suspension grooves 44. The second hook portions 43 are formed on a first side 30A of the focus unit 30 to be coupled and fixed to the first suspension grooves 41 when the focus unit 30 is pushed in the first direction A1. The second suspension grooves 44 are formed in a second side 30B of the focus unit 30 to be coupled and fixed to the first hook portions 42 when the focus unit 30 is pushed in the first direction A1.

Figure 4:
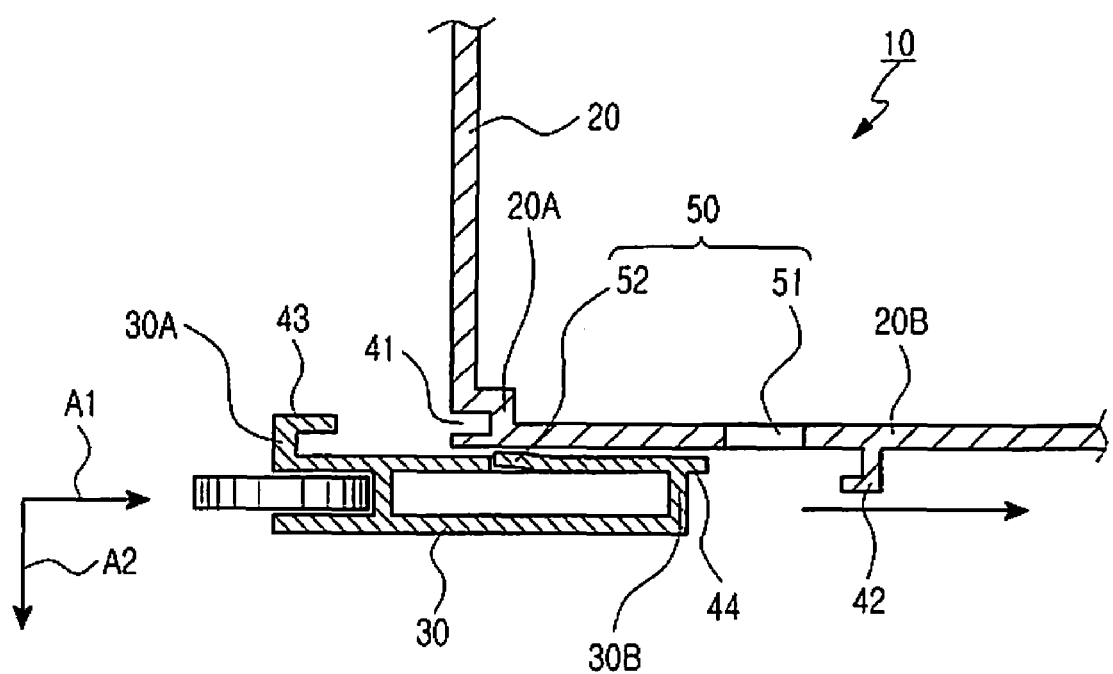
FIG. 4 illustrates a pre-operation (or before-operation) state of a focus unit fastening device for a projector according to an embodiment of the present invention.
Figure 5:
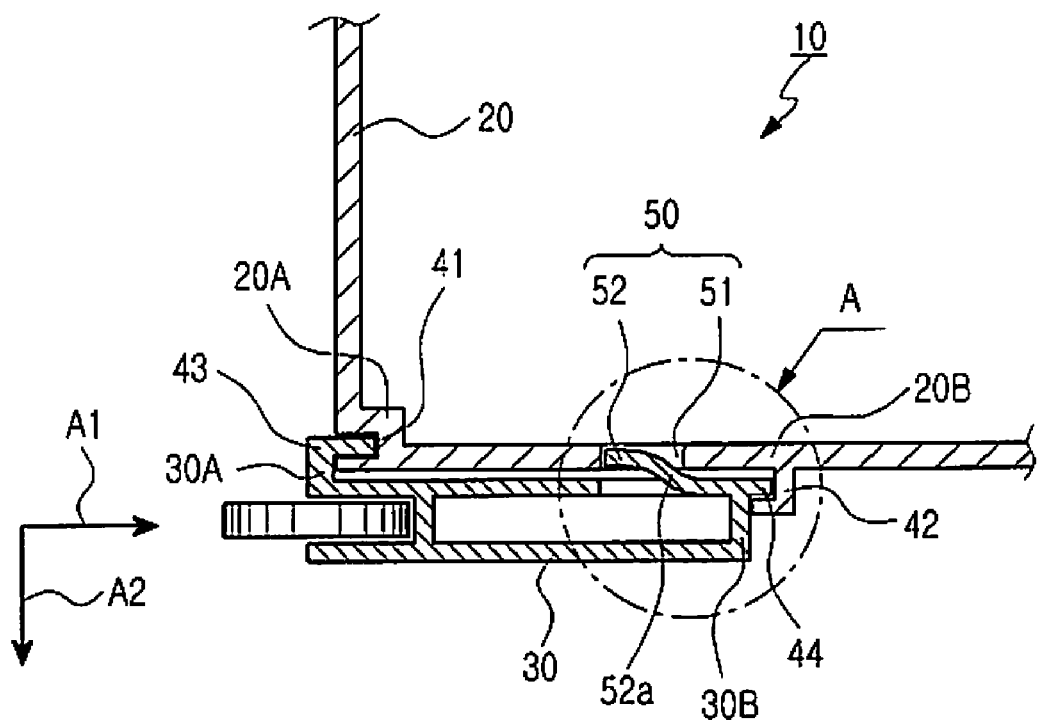
FIG. 5 illustrates a post-operation (after-operation) state of a focus unit fastening device for a projector according to an embodiment of the present invention.
Figure 6:
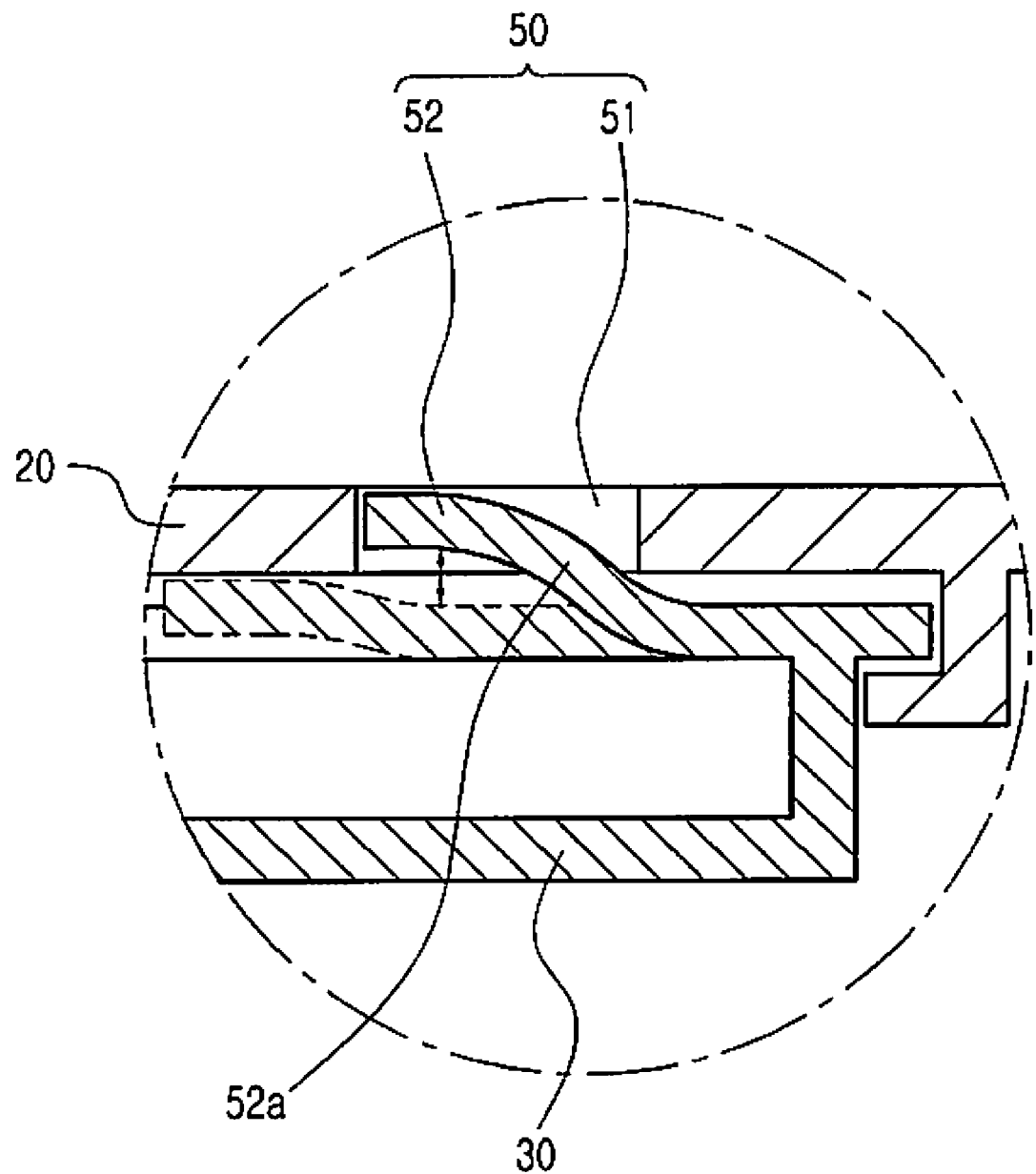
FIG. 6 illustrates a portion A of FIG. 5.

As shown in FIGS. 4 through 6, the first and second hook portions 42 and 43 include hook protrusions to be inserted into the second and first suspension grooves 44 and 41, respectively.

As shown in FIG. 2 and FIGS. 4 through 6, the second fastening portion 50 includes a fixing hole 51 and a fixing portion 52. The fixing hole 51 is formed in the main body housing 20, such that the fixing hole 51 is coupled and fixed to the fixing portion 52 to prevent the focus unit 30 from moving in the first direction A1. The fixing portion 52 is formed on the focus unit 30 to be provided in a position corresponding to the fixing hole 51. When the focus unit 30 is pushed in the first direction A1, the fixing portion 52 moves in a pressed state while being in contact with the main body housing 20. The fixing portion 52 is inserted into the fixing hole 51 by an elastic force, thereby fixing the focus unit 30.

As shown in FIG. 6, the fixing portion 52 includes a leaf spring to be inserted into the fixing hole 51.

Figure 7:
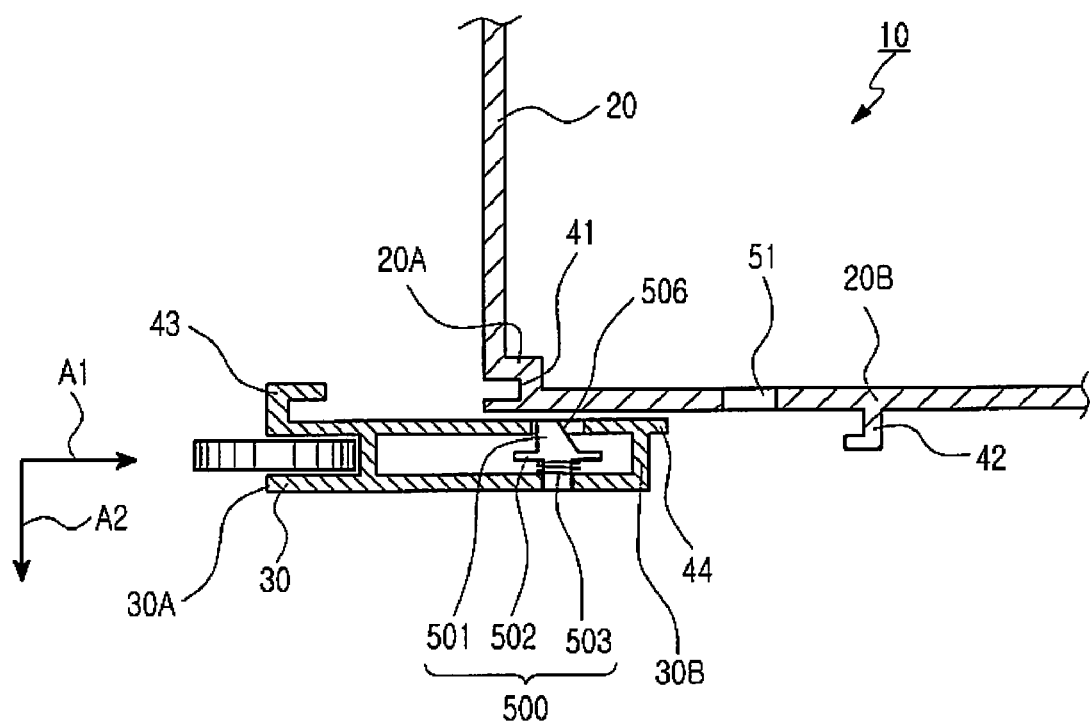
FIG. 7 illustrates a fixing portion of a focus unit fastening device for a projector according to an embodiment of the present invention, in which a pre-operation state of the fixing portion is shown.
Figure 8:
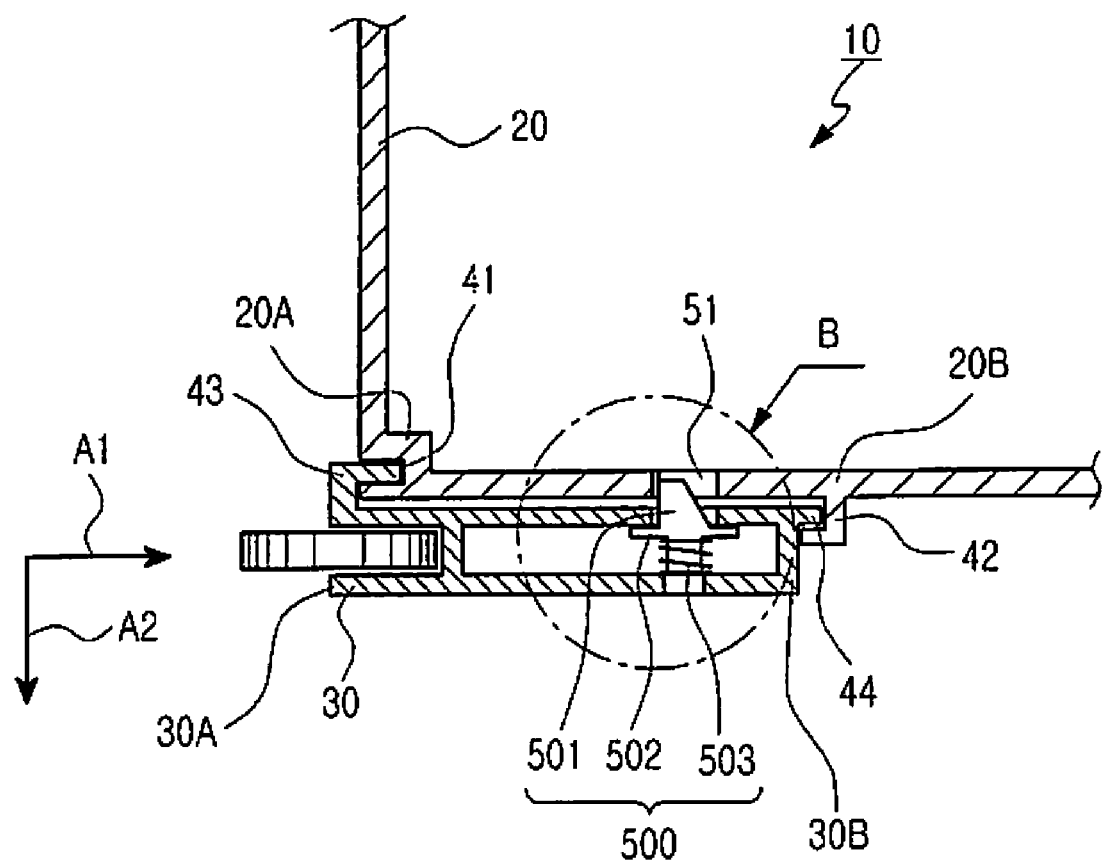
FIG. 8 illustrates a fixing portion of a focus unit fastening device for a projector according to an embodiment of the present invention, in which a post-operation state of the fixing portion is shown.
Figure 9:
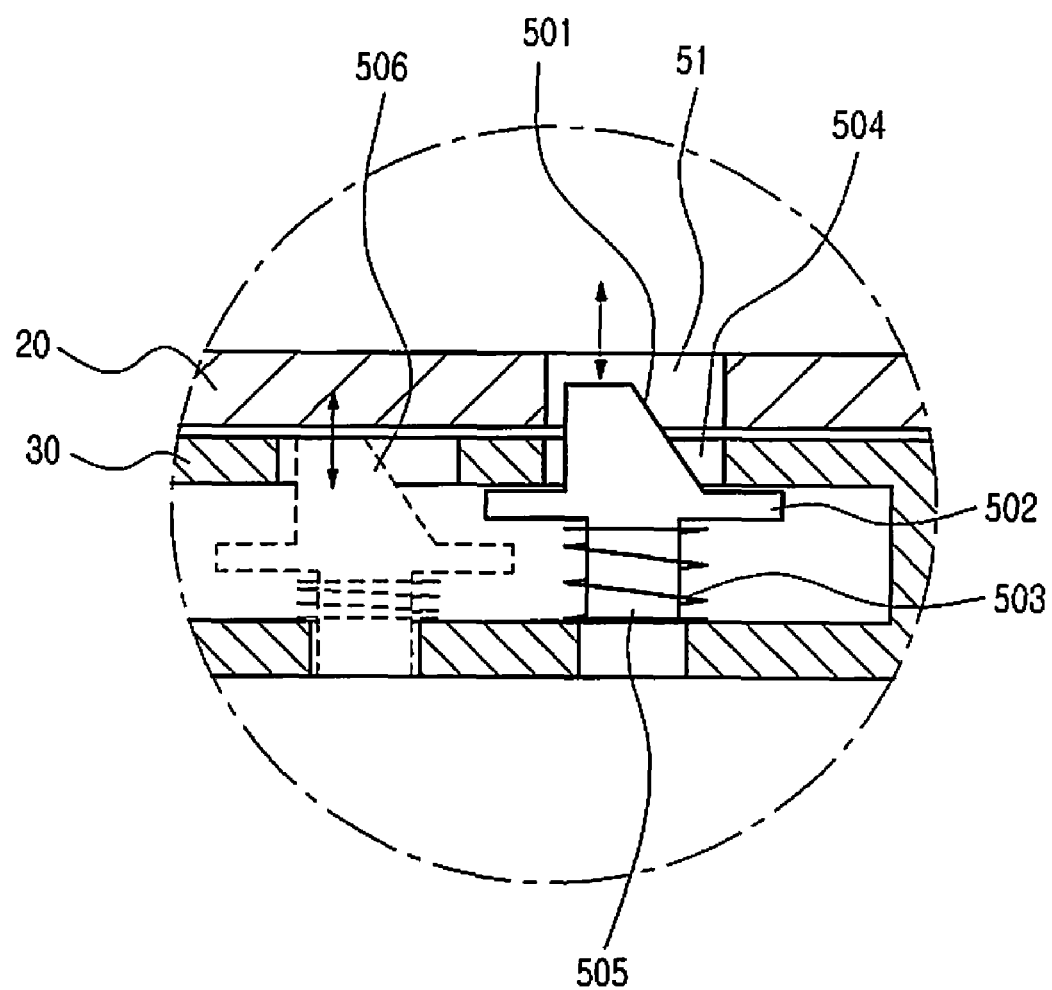
FIG. 9 illustrates a portion B of FIG. 8.

Referring to FIGS. 7 through 9, a fixing portion 500 includes a moving protrusion 501, a separation-preventing portion 502, and an elastic member 503.

The moving protrusion 501 is included in the focus unit 30 to be provided in a position corresponding to the fixing hole 51 of the main body housing 20. The moving protrusion 501 moves up and down while being in contact with the main body housing 20. In this state, the moving protrusion 501 is inserted into the fixing hole 51 by moving up and down again. The separation-preventing portion 502 is formed under the moving protrusion 501 to prevent the moving protrusion 501 from leaving the focus unit 30 during an up-and-down movement of the moving protrusion 501. The elastic member 503 is provided under the separation-preventing portion 502 to provide an elastic force for enabling the moving protrusion 501 to move up and down.

As shown in FIG. 9, formed in the focus unit 30 is a moving hole 504 for allowing the moving protrusion 501 to move up and down. Also formed in the focus unit 30 is an elastic supporting protrusion 505 that is coupled to and supports the elastic member 503. A guide slope 506 is formed in an upper portion of the moving protrusion 501 to facilitate the up-and-down movement of the moving protrusion 501 in the main body housing 20 and the fixing hole 51.

The operating process of the above-described focus unit fastening device for a projector according to an embodiment of the present invention will be described in more detail with reference to FIGS. 1 through 9.

As shown in FIGS. 2 through 6, the focus unit fastening device 10 for a projector includes the projector main body housing 20, the focus unit 30, and the first and second fastening portions 40 and 50. The first fastening portion 40 includes one or more first suspension grooves 41 and first hook portions 42 which are formed in a first side 20A and a second side 20B of the main body housing 20, respectively, and at least one or more second hook portions 43 and second suspension grooves 44 which are formed in a first side 30A and in a second side 30B of the focus unit 30, respectively. The second fastening portion 50 includes the fixing hole 51 formed in the main body housing 20 and the fixing portion 52 formed on the focus unit 30.

As shown in FIGS. 4 and 5, to engage the focus unit 30 to the main body housing 20, the focus unit 30 is urged to contact the main body housing 20 and is pushed in the first direction A1.

As shown in FIG. 5, the focus unit 30 moves along the main body housing 20 by being pushed in the first direction A1. In a movement end position of the focus unit 30, the second hook portions 43 formed on a side of the focus unit 30 are inserted into and engaged to the first suspension grooves 41 formed in a side of the main body housing 20.

Concurrently, the second suspension grooves 44 formed in the second side 30B of the focus unit 30 are inserted into and coupled to the first hook portions 42 formed on the second side of the main body housing 20.

In this state, as shown in FIG. 5, the focus unit 30 is fastened to the main body housing 20, thus being prevented from moving in the second direction A2 perpendicular to the first direction A1.

As shown in FIGS. 4 through 6, as the focus unit 30 is engaged to the main body housing 20, the fixing portion 52 formed on the focus unit 30 comes into contact with the main body housing 20 and is pressed. Once the focus unit 30 is moved, the fixing portion 52 protrudes by an elastic force when inserted into the fixing hole 51.

As the fixing portion 52 formed on the focus unit 30 is inserted into the fixing hole 51, the focus unit 30 is prevented from moving in the first direction A1.

As shown in FIGS. 5 through 6, the fixing portion 52 includes a leaf spring 52a such that the fixing portion 52, when contacting the main body housing 20, moves in a pressed state.

As shown in FIGS. 7 through 9, the fixing portion 500 according to an embodiment of the present invention includes the moving protrusion 501, the separation-preventing portion 502, and the elastic member 503.

The fixing portion 500 is mounted in the focus unit 30. To engage the focus unit 30 to the main body housing 20, the focus unit 30 is urged to contact the main body housing 20 and is pushed in the first direction A1.

As shown in FIGS. 8 and 9, the focus unit 30 moves along the main body housing 20 by being pushed in the first direction A1. The moving protrusion 501 of the focus unit 30 is inserted within the focus unit 30 by moving up and down. The guide slope 506 is formed in an upper portion of the moving protrusion 501, such that the moving protrusion 501 is guided by the guide slope 506 while being in contact with the main body housing 20, and thus moves up and down.

As shown in FIG. 9, once moving to a fixing position (or a movement end position) of the focus unit 30, the moving protrusion 501 inserted within the focus unit 30 moves up and down, thus being inserted into the fixing hole 51 formed in the main body housing 20.

The moving protrusion 501 includes the elastic member 503 that provides an elastic force for enabling the moving protrusion 501 to move up and down.

The moving protrusion 501 further includes the separation-preventing portion 502 for preventing the moving protrusion 501 from leaving the focus unit 30 when the moving protrusion 501 moves up and down.

Formed in the focus unit 30 is the moving hole 504 for allowing the up-and-down movement of the moving protrusion 501.

The focus unit fastening device for a projector according to an embodiment of the present invention can be applied to not only various types of mobile communication terminals, but also to any type of information communication apparatuses and multimedia apparatuses such as Portable Multimedia Players (PMPs), MP3 players, digital broadcasting players, Personal Digital Assistants (PDAs), and smart phones.

It will be obvious to those of ordinary skill in the art that the above-described focus unit fastening device for a projector according to the present invention is not limited to the foregoing embodiments and drawings, and various changes in form and details may be made therein without departing from the spirit and scope of the invention as defined by the appended claims.

What is claimed is:

1. A focus unit fastening device for a projector, comprising:
    a projector main body housing;
    a focus unit engaged to the main body housing;
    a first fastening portion provided on the main body housing and the focus unit to fasten the focus unit to the main body housing by pushing the focus unit in a first direction and to prevent the focus unit from moving in a second direction perpendicular to the first direction;
    a second fastening portion provided on the main body housing and the focus unit to fasten the focus unit to the main body housing by pushing the focus unit in the first direction and to prevent the focus unit from moving in the first direction;
    wherein the first fastening portion comprises:
    at least one first suspension groove formed in a first side of the main body housing; and
    at least one first hook portion formed in a second side of the main body housing.

2. The focus unit fastening device of claim 1, wherein the first fastening portion further comprises:
    at least one second hook portion formed in a first side of the focus unit such that the at least one second hook portion is coupled and fixed to the at least one first suspension groove when the focus unit is pushed in the first direction; and
    at least one second suspension groove formed in a second side of the focus unit such that the at least one second suspension groove is coupled and fixed to the at least one first hook portion when the focus unit is pushed in the first direction.

3. The focus unit fastening device of claim 2, wherein the first and second hook portions comprise hook protrusions, respectively.

4. The focus unit fastening device of claim 1, wherein the second fastening portion comprises:
    a fixing hole formed in the main body housing; and
    a fixing portion formed on the focus unit to be provided in a position corresponding to the fixing hole such that the fixing portion moves in a pressed state while being in contact with the main body housing when the focus unit is pushed in the first direction, and the fixing portion, upon arriving in the fixing hole, is inserted into the fixing hole by an elastic force, thus fixing the focus unit.

5. The focus unit fastening device of claim 4, wherein the fixing portion comprises a leaf spring.

6. The focus unit fastening device of claim 4, wherein the fixing portion comprises:
    a moving protrusion moving up and down while being in contact with the main body housing, the moving protrusion being inserted into the fixing hole by moving up and down when arriving in the fixing hole of the main body housing;
    a separation preventing portion formed under the moving protrusion to prevent the moving protrusion from leaving the focus unit during an up-and-down movement of the moving protrusion; and
    an elastic member provided under the separation preventing portion to provide an elastic force for enabling the up-and-down movement of the moving protrusion.

7. The focus unit fastening device of claim 6, wherein a moving hole for allowing the up-and-down movement of the moving protrusion is formed in the focus unit.

8. The focus unit fastening device of claim 6, wherein an elastic supporting protrusion is formed in the focus unit to be coupled to and support the elastic member.

9. The focus unit fastening device of claim 6, wherein a guide slope is formed in an upper portion of the moving protrusion such that the guide slope guides the moving protrusion to facilitate the up-and-down movement of the moving protrusion in the main body housing and the fixing hole.

10. The focus unit fastening device of claim 1, wherein the first and second fastening portions are provided integrally with the main body housing and the focus unit.

\* \* \* \* \*